US011132390B2

(12) United States Patent
Boxwell et al.

(10) Patent No.: US 11,132,390 B2
(45) Date of Patent: Sep. 28, 2021

(54) EFFICIENT RESOLUTION OF TYPE-COERCION QUERIES IN A QUESTION ANSWER SYSTEM USING DISJUNCTIVE SUB-LEXICAL ANSWER TYPES

(71) Applicant: International Business Machines Corporation, Armonk, NY (US)

(72) Inventors: Stephen A. Boxwell, Franklin, OH (US); Stanley J. Vernier, Grove City, OH (US); Kyle M. Brake, Dublin, OH (US); Keith G. Frost, Delaware, OH (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 16/247,955

(22) Filed: Jan. 15, 2019

(65) Prior Publication Data

US 2020/0226163 A1 Jul. 16, 2020

(51) Int. Cl.
*G06F 16/33* (2019.01)
*G10L 15/22* (2006.01)
*G06N 5/04* (2006.01)
*G06F 16/36* (2019.01)
*G06F 16/332* (2019.01)
*G06F 40/284* (2020.01)

(52) U.S. Cl.
CPC ...... *G06F 16/3344* (2019.01); *G06F 16/3329* (2019.01); *G06F 16/367* (2019.01); *G06F 40/284* (2020.01); *G06N 5/04* (2013.01); *G10L 15/22* (2013.01); *G10L 2015/225* (2013.01)

(58) Field of Classification Search
CPC .. G06F 16/3344; G06F 40/284; G06F 16/367; G06F 16/3329; G06F 40/20; G10L 15/22; G10L 2015/225; G06N 5/04
See application file for complete search history.

(56) References Cited

U.S. PATENT DOCUMENTS 8,332,394 B2  12/2012  Fan et al.
9,015,031 B2   4/2015  Ferruci et al.
9,336,296 B2 *  5/2016  Achtermann ......... G06F 16/285
(Continued)

OTHER PUBLICATIONS

Ferrucci, David, Eric Brown, Jennifer Chu-Carroll, James Fan, David Gondek, Aditya A. Kalyanpur, Adam Lally et al. "Building Watson: An overview of the DeepQA project." AI magazine 31, No. 3 (2010): 59-79. (Year: 2010).*

(Continued)

*Primary Examiner* — Jesse P Frumkin
(74) *Attorney, Agent, or Firm* — VanLeeuwen & VanLeeuwen; David K. Mattheis

(57) ABSTRACT

An approach is provided in which an information handling system identifies candidate answers from a knowledge base that correspond to a question comprising a lexical answer type (LAT). The information handling system determines sub-LATs corresponding to the LAT in a database that are child LATs of the LAT. The information handling system then identifies a set of the candidate answers that correspond to at least one of the sub-LATs and ranks the set of candidate answers based on one or more ranking criterion. In turn, the information handling system provides the ranked set of candidate answers to a user.

20 Claims, 8 Drawing Sheets

(56) References Cited

U.S. PATENT DOCUMENTS

| | | | |
|---|---|---|---|
| 9,508,038 B2 | 11/2016 | Ferrucci et al. | |
| 2011/0231395 A1* | 9/2011 | Vadlamani | G06F 16/358 707/723 |
| 2011/0258230 A1* | 10/2011 | Jung | G06N 5/02 707/780 |
| 2012/0078873 A1* | 3/2012 | Ferrucci | G06F 16/3329 707/708 |
| 2012/0078890 A1 | 3/2012 | Fan | |
| 2012/0078902 A1 | 3/2012 | Duboue | |
| 2013/0262361 A1* | 10/2013 | Arroyo | G06F 16/245 706/46 |
| 2013/0262449 A1* | 10/2013 | Arroyo | G06F 16/3325 707/722 |
| 2014/0358890 A1* | 12/2014 | Chen | G06F 16/3329 707/710 |
| 2016/0133146 A1* | 5/2016 | Bak | G10L 15/1822 434/322 |
| 2016/0306852 A1* | 10/2016 | Guggilla | G06F 16/24578 |
| 2017/0308531 A1* | 10/2017 | Ma | G06F 16/24522 |
| 2018/0018313 A1* | 1/2018 | Bishop | G06N 3/006 |
| 2019/0146985 A1* | 5/2019 | Zou | G06F 16/3334 707/715 |

OTHER PUBLICATIONS

Lally, Adam, John M. Prager, Michael C. McCord, Branimir K. Boguraev, Siddharth Patwardhan, James Fan, Paul Fodor, and Jennifer Chu-Carroll. "Question analysis: How Watson reads a clue." IBM Journal of Research and Development 56, No. 3.4 (2012): 2-1. (Year: 2012).*

Heo, Jeong, Hyung-Jik Lee, Ji-Hyun Wang, Yong-Jin Bae, Hyun-Ki Kim, and Cheol-Young Ock. "Restricting Answer Candidates Based on Taxonomic Relatedness of Integrated Lexical Knowledge Base in Question Answering." ETRI Journal 39, No. 2 (2017): 191-201. (Year: 2017).*

Fan et al., "Mining Knowledge from Large Corpora for Type Coercion in Question Answering," SemanticScholar, 2011, 17 pages.

Murdock et al., "Typing Candidate Answers using Type Coercion," International Business Machines Corporation, 2012, 13 pages.

* cited by examiner

EFFICIENT RESOLUTION OF TYPE-COERCION QUERIES IN A QUESTION ANSWER SYSTEM USING DISJUNCTIVE SUB-LEXICAL ANSWER TYPES

BACKGROUND

A question answer system answers questions posed in a natural language format by applying advanced natural language processing, information retrieval, knowledge representation, automated reasoning, and machine learning technologies. Question answer systems differ from typical document search technologies because document search technologies generate a list of documents ranked in order of relevance based on a word query, whereas question answer systems analyze contextual details of a question expressed in a natural language and provide a precise answer to the question.

When a question answer system receives a question, the question answer system identifies a lexical answer type (LAT) of the question based on terms in the question that indicate for what "type" of entity is being asked, such as a "person," "city," "building," etc. The question answer system then identifies a host of candidate answers from a knowledge base according to the LAT and other question attributes.

The question answer system then proceeds through a series of steps to score and rank the candidate answers using various hypothesis and evidence scoring techniques. Type-Coercion (TyCor) is an evidence scoring technique that generates a TyCor confidence value by comparing the type of a particular candidate answer to a LAT of the question to compute a probability of whether the particular candidate answer could be a correct answer to the question. For example, an answer to the question "Who signed the affordable care act?" should include a "person" type.

Although many ways area available to determine a type of a candidate answer, one of the most effective approaches is to maintain a database of types associated with a list of entities in an ontology graph that represents abstract types and their surface form representations (different forms of a word as the word appears in text). The question answer system then performs an open-ended database query to determine the type of a candidate answer.

Unfortunately, as the number of candidate answers for questions increases exponentially due to an increasingly amount of available data, open-ended database queries to filter the candidate answers becomes very expensive. In fact, ruling out a candidate answer-type pairing is particularly expensive because it requires the database query to exhaust all possible paths through the ontology graph, which can take an enormous amount of time with a large ontology graph.

BRIEF SUMMARY

According to one embodiment of the present disclosure, an approach is provided in which an information handling system identifies candidate answers from a knowledge base that correspond to a question comprising a lexical answer type (LAT). The information handling system determines sub-LATs corresponding to the LAT in a database that are child LATs of the LAT. The information handling system then identifies a set of the candidate answers that correspond to at least one of the sub-LATs and ranks the set of candidate answers based on one or more ranking criterion. In turn, the information handling system provides the ranked set of candidate answers to a user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
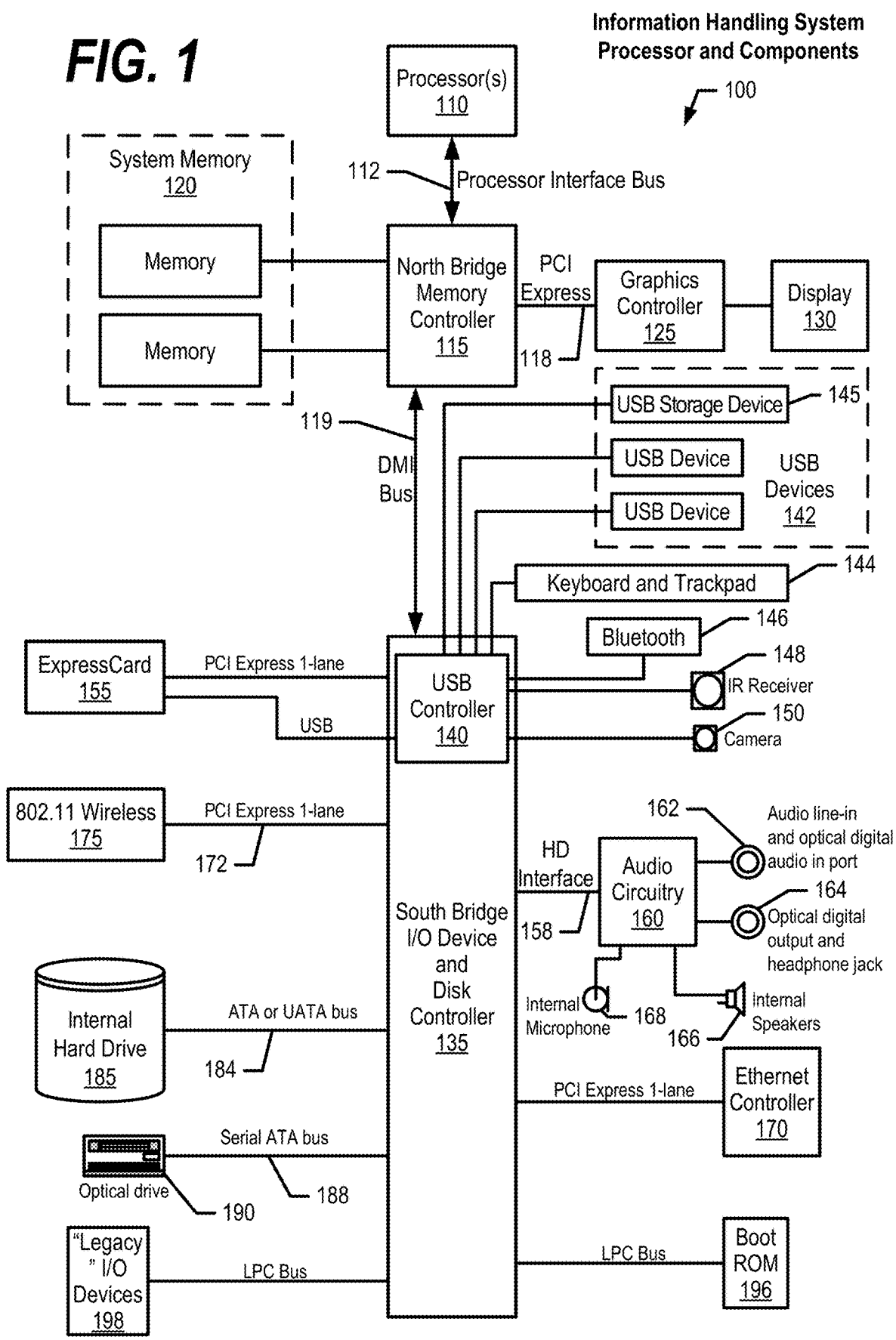
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
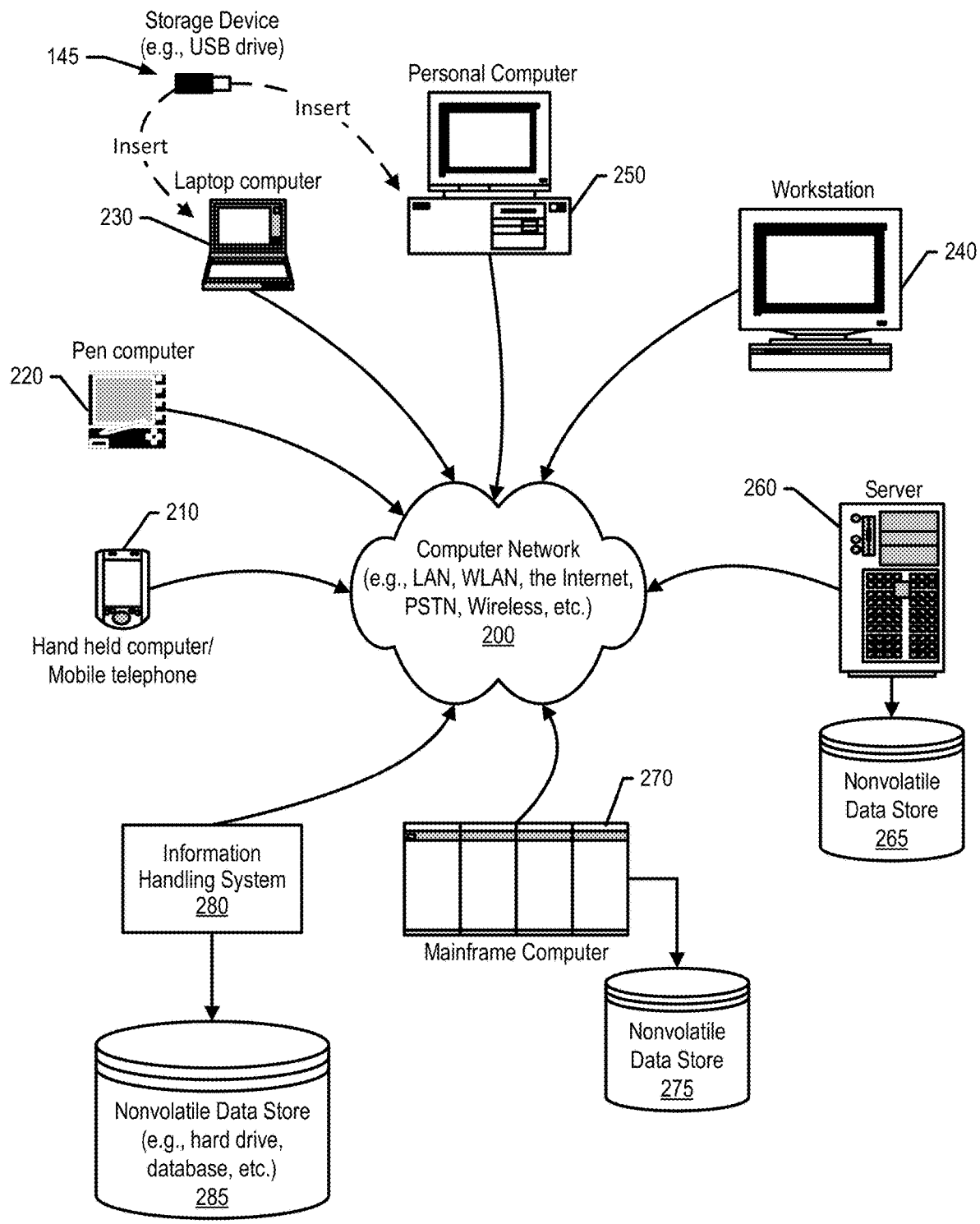
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, today's question answer systems use open-ended database queries to compute TyCor confidence values based on whether a candidate answer type matches a LAT of a question, which can be an expensive and time consuming process. In one embodiment, open-ended questions are "Is A a B" style queries, such as "Is Barack Obama a president?" "Is George W. Bush a high school?" "Is Ronald Reagan a country?" FIGS. 3 through 8 depict an approach that can be implemented on an information handling system that solves the problem of using expensive open-ended queries during TyCor analysis to compare a candidate answer's type to a LAT of a question. As discussed in detail below, the information handling system performs an "advance" query that identifies sub-LATs (e.g., child LATs) of the question LAT and uses the sub-LATs in combination with the candidate answers to perform fast queries on each of the candidate answer/sub-LAT pairs (node-edge-node queries). The information handling system then uses the results of the fast queries to assign TyCor confidence values to the candidate answers, which the information handling system uses to rank the candidate answers.

A trade-off solution is discussed herein that analyzes multiple simultaneous tycor queries on the fly and determines a strategy most likely to provide optimal performance results by grouping together similar queries and sharing information between them. By doing this, factoid QA systems that often query tycor components in predictable ways can permit the tycor component to make use of intermediate results from other simultaneous queries.

Figure 3:
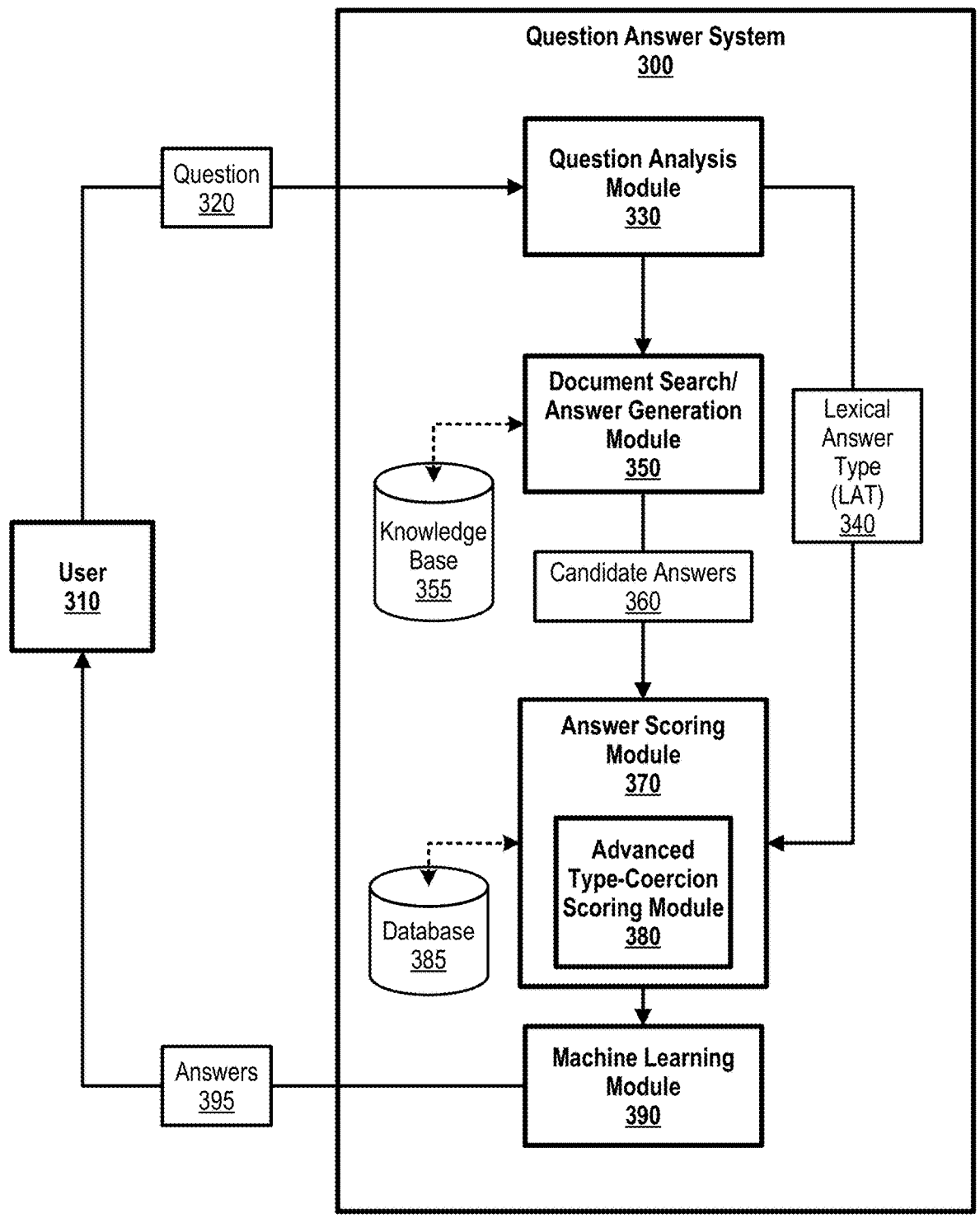
FIG. 3 is an exemplary diagram depicting a question answer system using and advanced type-coercion scoring module to reduce the amount of time to compare candidate answer types against a question lexical answer type (LAT)

FIG. 3 is an exemplary diagram depicting a question answer system using and advanced type-coercion scoring module to reduce the amount of time to compare candidate answer types against a question lexical answer type (LAT). Question answer system 300 receives question 320 from user 310, such as "Who signed the Affordable Care Act?" Question analysis module 330 identifies the lexical answer type (LAT) "Who" and sends LAT 340 to answer scoring module 370 to perform a sub-LAT query on database 385 that identifies a node in an ontology graph corresponding to LAT 340 and traverses down the ontology graph (triples database) to identify all of the sub-LATs (child nodes) associated with LAT 340 (see FIGS. 6, 7, and corresponding text for further details).

Question analysis module 330 also sends question attributes, which includes LAT 340, to document search/answer generation module 350. Document search/answer generation module 350 searches knowledge base 355 and identifies candidate answers 360 based on the question attributes. For example, document search/answer generation module 350 is likely to find hundreds or even thousands of candidate answers that correspond to "Who," which are eventually evaluated by answer scoring module 370 and machine learning module 390 based on type, passage-based evidence, and other factors.

Answer scoring module 370 receives candidate answers 360 and performs multiple fast (node-edge-node) queries on candidate answer/sub-LAT combinations using advanced type-coercion scoring module 380 to determine which of a selected candidate answers 360 matches one of the sub-LATs. Answer scoring module 370 then assigns a TyCor confidence value to the candidate answers based on the fast query results (see FIGS. 4, 5, 8, and corresponding text for further details).

In turn, answer scoring module 370 uses the TyCor confidence values in conjunction with other candidate answer scoring approaches to rank candidate answers 360 accordingly. The ranked candidate answers are fed into machine learning module 390, which weights the selected candidate answers according to a training set and sends answers 395 to user 310.

Figure 4:
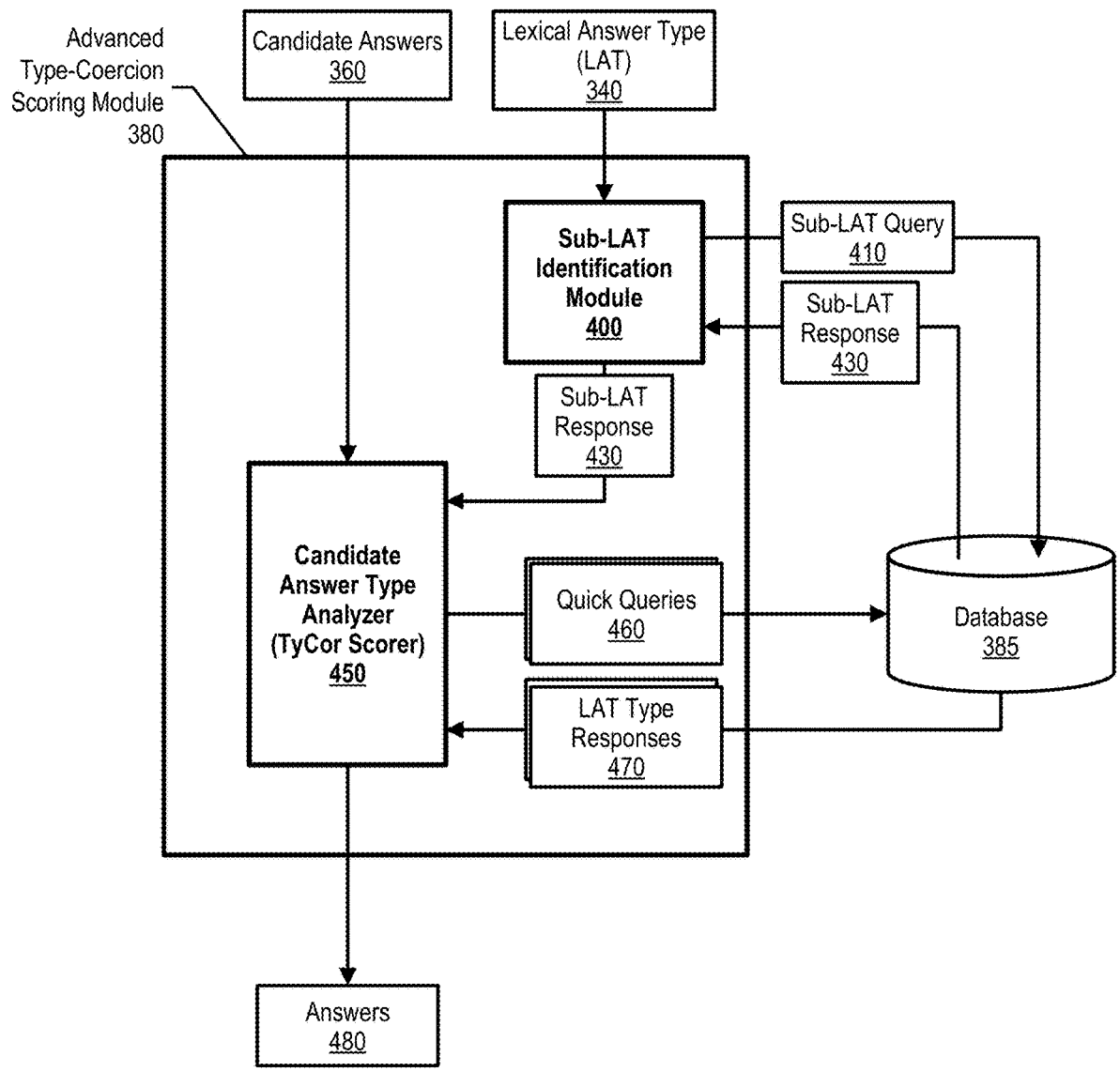
FIG. 4 is an exemplary diagram depicting an advanced type-coercion scoring module efficiently performing type-coercion scoring of candidate answers based on an initial sub-LAT query and multiple fast queries.

FIG. 4 is an exemplary diagram depicting an advanced type-coercion scoring module efficiently performing type-coercion scoring of candidate answers based on an initial sub-LAT query and multiple fast queries. Advanced type-coercion scoring module 380 includes sub-LAT identification module 400 and candidate answer type analyzer 450. Sub-LAT identification module 400 receives LAT 340 and performs a sub-LAT query 410 on database 385, which searches for sub-LATs, or child LATs, of LAT 340 in an ontology graph/triples database (see FIGS. 5-7 and corresponding text for further details). Sub-LAT identification module 400 receives sub-LAT response 430 and provides sub-LAT response 430 to candidate answer type analyzer 450.

Figure 8:
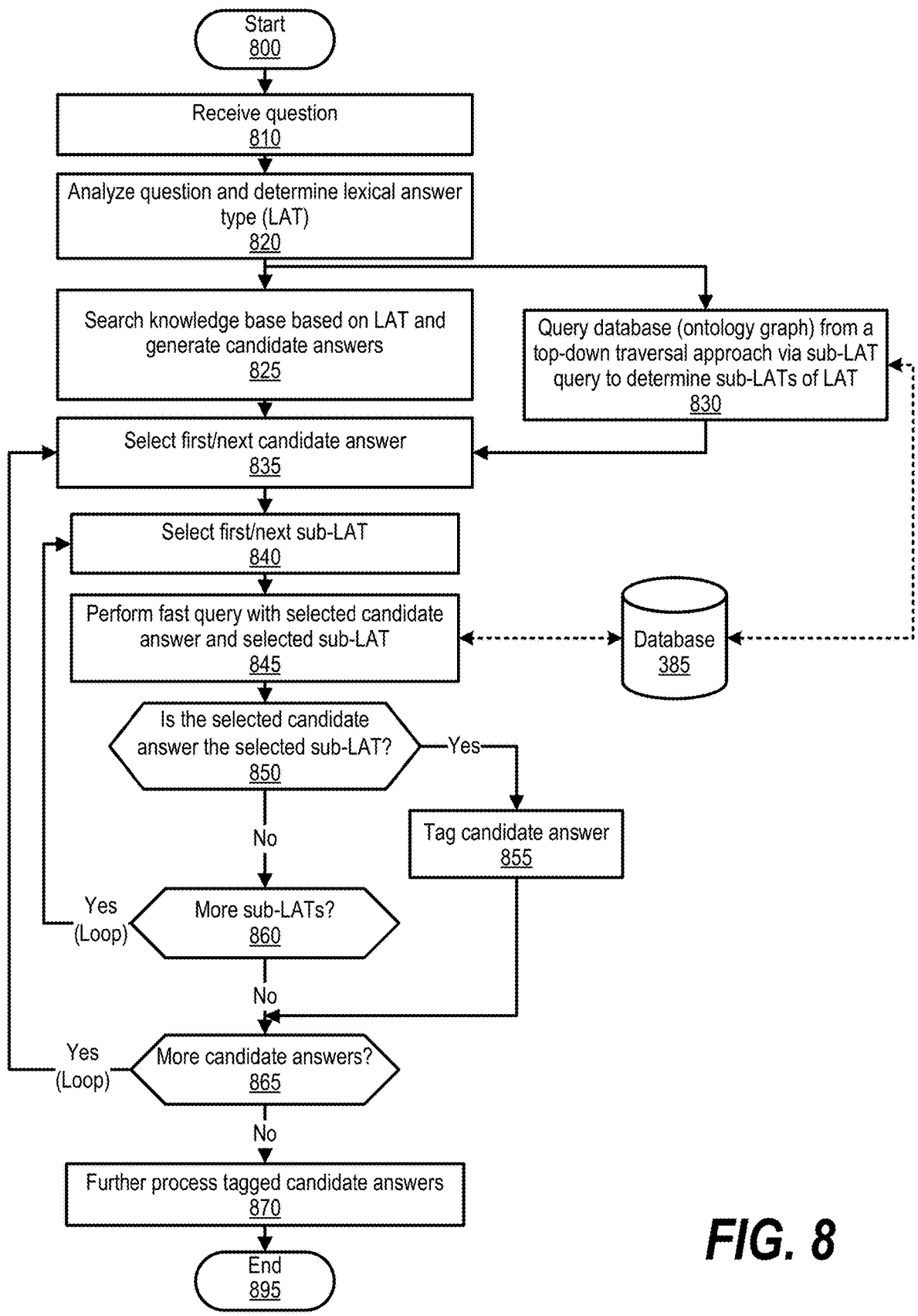
FIG. 8 is an exemplary flowchart depicting steps taken to generate TyCor confidence values for candidate answers.

Candidate answer type analyzer 450 performs multiple fast queries 460 for each combination of sub-LAT/candidate answer to determine which of candidate answers 360 are of a type that matches one of sub-LATs 440 (see FIG. 8 and corresponding text for further details). Candidate answer type analyzer 450 receives LAT type responses 470 (e.g., 1 or 0) and tags (assigns a confidence value to) those candidate answers that match one of sub-LATs 440. In turn, candidate answer LAT analyzer 450 sends the tagged answers 480 onto further statistical answer ranking algorithms that, in one embodiment, tend to prefer candidate answers with higher TyCor confidence values over answers with lower TyCor confidence values.

Figure 5:
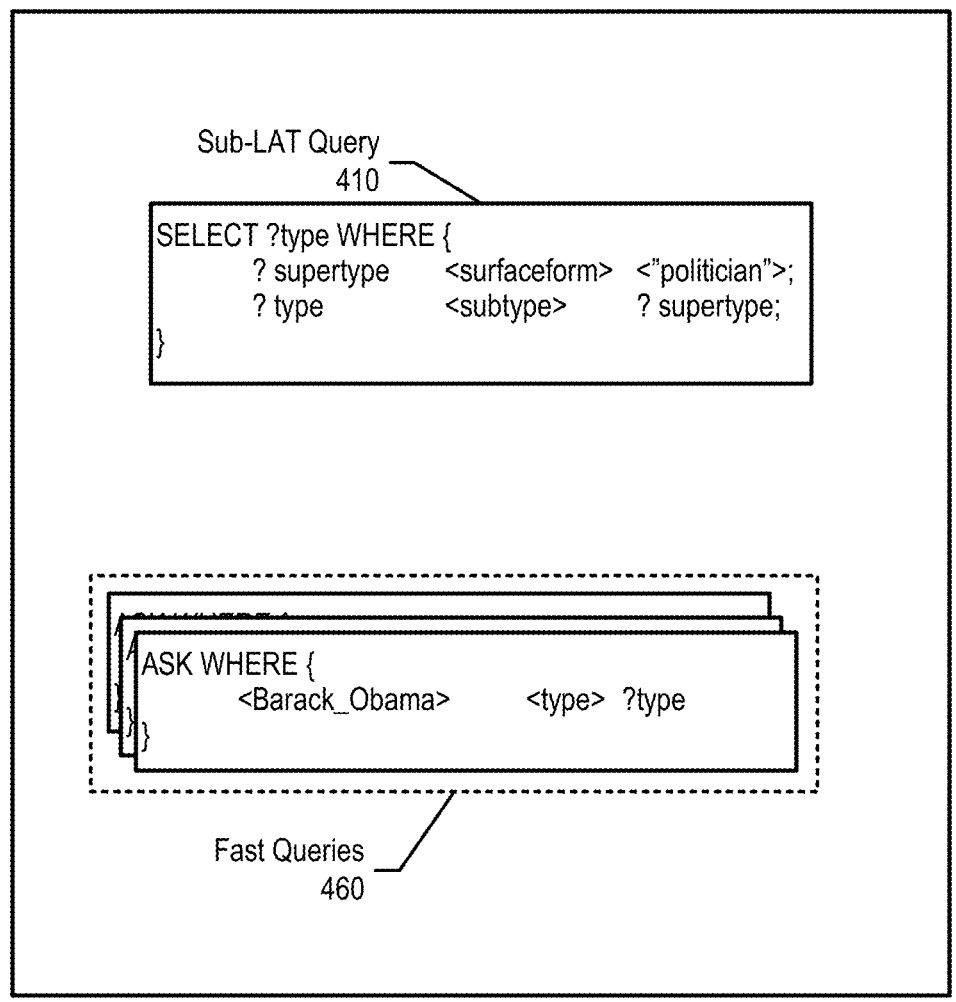
FIG. 5 is an exemplary diagram depicting sub-LAT queries and fast queries as discussed herein.

FIG. 5 is an exemplary diagram depicting sub-LAT queries and fast queries as discussed herein. Advanced type-coercion scoring module 380 uses a form of sub-LAT query 410 to identify all sub-LATs of a question's LAT in a database (ontology graph, triples database, etc.). The example shown in FIG. 6 shows that sub-LAT query 410 is searching for all sub-LATs corresponding to the LAT "politician." Sub-LAT query identifies all of the surface forms of politician and then identifies all the sub types of the surface forms to generate a list of the sub-LATs.

Advanced type-coercion scoring module 380 then uses fast queries 460 for candidate answer/sub-LAT combinations to see if an entry exists in the database where the candidate answer is of type sub-LAT. As discussed herein, these types of node-edge-node queries are extremely fast and require minimal resources.

Figure 6:
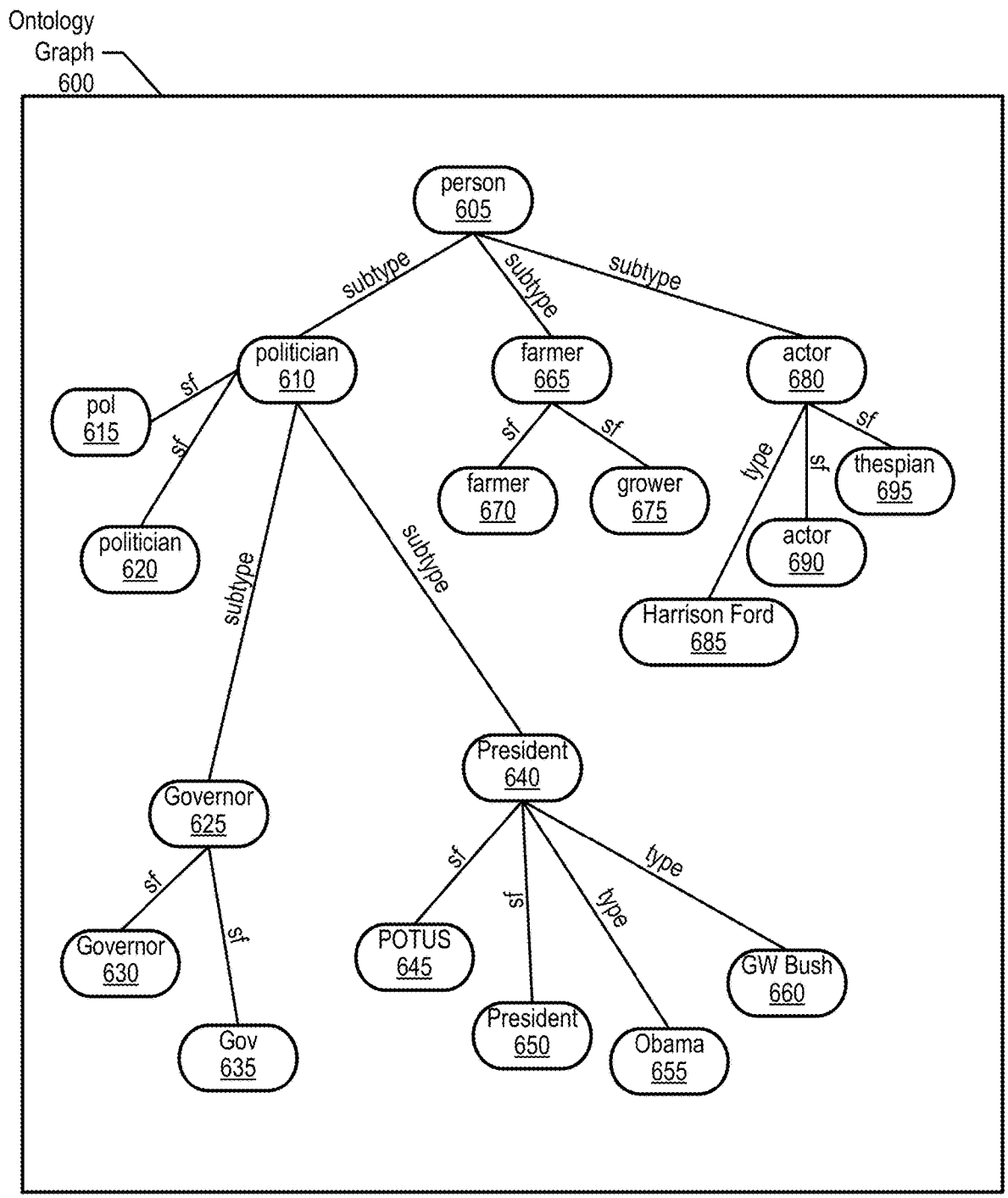
FIG. 6 is an exemplary diagram depicting an ontology graph such as one stored in database store 385 that, in one embodiment, is a graphical representation of a triples database.

FIG. 6 is an exemplary diagram depicting an ontology graph such as one stored in database store 385 that, in one embodiment, is a graphical representation of a triples database. Ontology graph 600 includes nodes 605 through 695, which are connected by subtype edges, surface form (sf) edges, and type edges. Person 605 includes subtypes politician 610, farmer 665, and actor 680.

Politician 610 has two surface forms (different forms of the word as it appears in text), which are pol 615 and politician 620. Politician 610 also has two subtypes governor 625 and President 640. Governor 625 has two surface forms governor 630 and Gov 635. President 640 has two surface forms POTUS 645 and President 650, and also has two types Obama 655 and GW Bush 660. Farmer 665 includes two surface forms farmer 670 and grower 675. Actor includes type Harrison Ford 685 and two surface types actor 690 and thespian 695.

Figure 7:
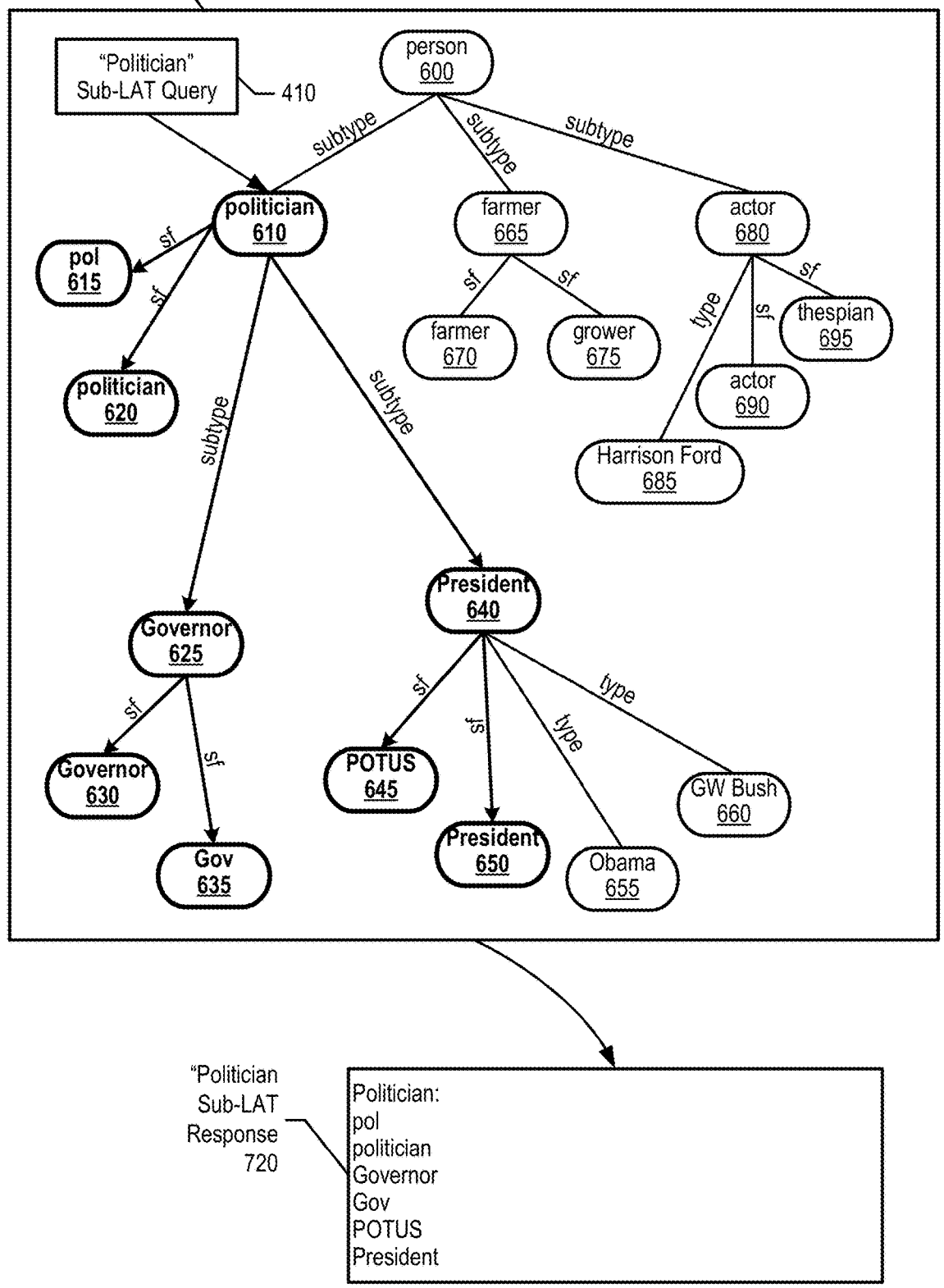
FIG. 7 is an exemplary diagram depicting a top-down approach to identify sub-LATs of a "politician" LAT.

Ontology graph 600 is a small example of the types of ontology graphs/triples databases utilized by question answer systems. To reduce the overall amount of time to perform type coercion analysis on candidate answers, advanced type-coercion scoring module 380 performs two types of queries on ontology graph 400. The first query is a sub-LAT query that identifies sub-LATs, or child LATs of a particular LAT from a question. FIG. 7 shows a top-down approach to identify sub-LATs of a "politician" LAT. The second type of query is a fast (node-edge-node) query to determine if a candidate answer is of a type that matches one of the sub-LATs, such as "Is Obama of type President" (see FIG. 8 and corresponding text for further details).

FIG. 7 is an exemplary diagram depicting a top-down approach to identify sub-LATs of a "politician" LAT. When advanced type-coercion scoring module 380 performs sub-LAT query 410, the query identifies politician 610 node and traverses down ontology graph 600 to identify all of the sub-types associated with the politician 610 node, which are pol 615, politician 620, Governor 630, Gov 635, POTUS 645, and President 650. In turn, sub-LAT response 720 includes the identified sub-LATs and surface forms that advanced type-coercion scoring module 380 combines with the candidate answers to perform fast queries (see FIG. 8 and corresponding text for further details).

FIG. 8 is an exemplary flowchart depicting steps taken to generate TyCor confidence values for candidate answers. FIG. 8 processing commences at 800 whereupon, at step 810, the process receives a question. At step 820, the process analyzes the question and determines a lexical answer type (LAT) of the question, such as "politician."

At step 825, the process searches knowledge base 355 and identifies candidate answers based on the question LAT and other question attributes. In addition, at step 830, the process performs a sub-LAT query on database 385 (ontology graph 600) using a top-down traversal approach to identify sub-LATs of the question LAT (see FIG. 7 and corresponding text for further details). As discussed below in steps 835 through 865, the process performs several fast (node-edge-node) queries based on candidate answer/sub-LAT combinations to determine which of the candidate answers match one of the sub-LATs.

At step 835, the process selects the first candidate answer and, at step 840, the process selects the first sub-LAT. At step 845, the process performs a fast query on database 385 to determine if the selected candidate answer is of type "sub-LAT." For example, the query may be "ASK WHERE {<GW Bush> type President}."

The process determines, based on query results of the fast query, as to whether the selected candidate answer is of the selected sub-LAT (decision 850). If the candidate answer is of the type of the selected sub-LAT, then decision 850 branches to the 'yes' branch whereupon, at step 855, the process tags the candidate answer and, in one embodiment, generates a TyCor confidence value.

On the other hand, if the candidate answer is not of type sub-LAT, then decision 850 branches to the 'no' branch. The process determines as to whether there are more sub-LATs to compare against the selected candidate answer (decision 860). If there are more sub-LATs to compare against the selected candidate answer, then decision 860 branches to the "yes" branch which loops back to select the next sub-LAT and query database 385 using the selected candidate answer and the newly selected sub-LAT. This process continues until there are no more sub-LATs to query against the selected candidate answer, at which point decision 860 branches to the "no" branch exiting the loop.

The process determines as to whether there are more candidate answers upon which to perform fast queries (decision 865). If there are more candidate answers upon which to perform fast queries, then decision 865 branches to the 'yes' branch which loops back to select the next candidate answer and perform fast queries using the sub-LATs. This looping continues until there are no more candidate answers upon which to perform queries, at which point decision 865 branches to the 'no' branch exiting the loop. At step 870, the process furthers process the tagged candidate answers to determine the highest ranking candidate answers based, in part, on the TyCor confidence values. FIG. 8 processing thereafter ends at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    receiving a question and determining a lexical answer type (LAT) that indicates an answer type corresponding to the question;
    identifying a plurality of candidate answers from a knowledge base that correspond to the LAT;
    querying an ontology graph comprising a plurality of answer types, wherein the querying identifies a node in the ontology graph corresponding to the LAT and traverses downward on the ontology graph to identify a plurality of sub-LATs of the LAT, and wherein each one of the plurality of sub-LATs corresponds to one of the plurality of answer types;
    identifying a set of the plurality of candidate answers that correspond to at least one of the plurality of sub-LATs;
    ranking the set of candidate answers based on one or more ranking criterion; and
    providing the ranked set of candidate answers to the question.

2. The method of claim 1 further comprising:
    generating a sub-LAT query that comprises the LAT; and
    querying the ontology graph using the sub-LAT query.

3. The method of claim 2 wherein the identifying of the set of candidate answers further comprises:
    for each of a selected one of the plurality of candidate answers and a selected one of the plurality of sub-LATs:
        generating a fast query that comprises the selected candidate answer and the selected sub-LAT; and querying the ontology graph using the fast query, wherein the fast query determines whether the selected candidate answer is of a type that matches the selected sub-LAT.

4. The method of claim 3 further comprising:
terminating the querying of the ontology graph for the selected candidate answer in response to determining that the candidate answer is of the type that matches the selected sub-LAT.

5. The method of claim 3 wherein the fast query is a single atomic triple query to evaluate whether a triples database corresponding to the ontology graph comprises a triples entry that includes the selected candidate answer and the selected sub-LAT.

6. The method of claim 1 further comprising:
generating one of a set of type-coercion (TyCor) scores for each of the set of candidate answers; and
performing the ranking based on the set of TyCor scores.

7. The method of claim 1 further comprising:
performing a sub-LAT query on a database to determine the plurality of sub-LATs corresponding to the LAT; and
determining, during the sub-LAT query, a plurality of surface forms corresponding to the LAT and the plurality of sub-LATs.

8. An information handling system comprising:
one or more processors;
a memory coupled to at least one of the processors;
a set of computer program instructions stored in the memory and executed by at least one of the processors in order to perform actions of:
receiving a question and determining a lexical answer type (LAT) that indicates an answer type corresponding to the question;
identifying a plurality of candidate answers from a knowledge base that correspond to the LAT;
querying an ontology graph comprising a plurality of answer types, wherein the querying identifies a node in the ontology graph corresponding to the LAT and traverses downward on the ontology graph to identify a plurality of sub-LATs of the LAT, and wherein each one of the plurality of sub-LATs corresponds to one of the plurality of answer types;
identifying a set of the plurality of candidate answers that correspond to at least one of the plurality of sub-LATs;
ranking the set of candidate answers based on one or more ranking criterion; and
providing the ranked set of candidate answers to the question.

9. The information handling system of claim 8 wherein the processors perform additional actions comprising:
generating a sub-LAT query that comprises the LAT; and
querying the ontology graph using the sub-LAT query.

10. The information handling system of claim 9 wherein the processors perform additional actions comprising:
for each of a selected one of the plurality of candidate answers and a selected one of the plurality of sub-LATs:
generating a fast query that comprises the selected candidate answer and the selected sub-LAT; and
querying the ontology graph using the fast query, wherein the fast query determines whether the selected candidate answer is of a type that matches the selected sub-LAT.

11. The information handling system of claim 10 wherein the processors perform additional actions comprising:
terminating the querying of the ontology graph for the selected candidate answer in response to determining that the candidate answer is of the type that matches the selected sub-LAT.

12. The information handling system of claim 10 wherein the fast query is a single atomic triple query to evaluate whether a triples database corresponding to the ontology graph comprises a triples entry that includes the selected candidate answer and the selected sub-LAT.

13. The information handling system of claim 8 wherein the processors perform additional actions comprising:
generating one of a set of type-coercion (TyCor) scores for each of the set of candidate answers; and
performing the ranking based on the set of TyCor scores.

14. The information handling system of claim 8 wherein the processors perform additional actions comprising:
performing a sub-LAT query on a database to determine the plurality of sub-LATs corresponding to the LAT; and
determining, during the sub-LAT query, a plurality of surface forms corresponding to the LAT and the plurality of sub-LATs.

15. A computer program product stored in a computer readable storage medium, comprising computer program code that, when executed by an information handling system, causes the information handling system to perform actions comprising:
receiving a question and determining a lexical answer type (LAT) that indicates an answer type corresponding to the question;
identifying a plurality of candidate answers from a knowledge base that correspond to the LAT;
querying an ontology graph comprising a plurality of answer types, wherein the querying identifies a node in the ontology graph corresponding to the LAT and traverses downward on the ontology graph to identify a plurality of sub-LATs of the LAT, and wherein each one of the plurality of sub-LATs corresponds to one of the plurality of answer types;
identifying a set of the plurality of candidate answers that correspond to at least one of the plurality of sub-LATs;
ranking the set of candidate answers based on one or more ranking criterion; and
providing the ranked set of candidate answers to the question.

16. The computer program product of claim 15 wherein the information handling system performs further actions comprising:
generating a sub-LAT query that comprises the LAT; and
querying the ontology graph using the sub-LAT query.

17. The computer program product of claim 16 wherein the information handling system performs further actions comprising:
for each of a selected one of the plurality of candidate answers and a selected one of the plurality of sub-LATs:
generating a fast query that comprises the selected candidate answer and the selected sub-LAT; and
querying the ontology graph using the fast query, wherein the fast query determines whether the selected candidate answer is of a type that matches the selected sub-LAT.

18. The computer program product of claim 17 wherein the information handling system performs further actions comprising:

terminating the querying of the ontology graph for the selected candidate answer in response to determining that the candidate answer is of the type that matches the selected sub-LAT.

19. The computer program product of claim 17 wherein the fast query is a single atomic triple query to evaluate whether a triples database corresponding to the ontology graph comprises a triples entry that includes the selected candidate answer and the selected sub-LAT.

20. The computer program product of claim 15 wherein the information handling system performs further actions comprising:

generating one of a set of type-coercion (TyCor) scores for each of the set of candidate answers; and performing the ranking based on the set of TyCor scores.

* * * * *